United States Patent
Richard et al.

(10) Patent No.: US 7,771,667 B2
(45) Date of Patent: Aug. 10, 2010

(54) POLYMERIZATION QUENCH METHOD AND SYSTEM

(75) Inventors: E. Baud Richard, League City, TX (US); F. McDonald Michael, Kingwood, TX (US); T. Milner Scott, Somerville, NJ (US); D. Shaffer Timothy, Hackettstown, NJ (US); H. Schatz Ralph, Sunset, SC (US); N. Webb Robert, Kingwood, TX (US); J. Wright Pamela, Easton, PA (US); Courseaux Jean-Pierre, St. Nicolas De La Taille (FR)

(73) Assignee: ExxonMobil Chemical Patents Inc., Houston, TX (US)

( * ) Notice: Subject to any disclaimer, the term of this patent is extended or adjusted under 35 U.S.C. 154(b) by 425 days.

(21) Appl. No.: 12/020,191

(22) Filed: Jan. 25, 2008

(65) Prior Publication Data

US 2008/0194777 A1    Aug. 14, 2008

(51) Int. Cl.
B01J 19/00 (2006.01)
C08F 2/00 (2006.01)
C08G 85/00 (2006.01)
C08F 4/00 (2006.01)
F17D 1/00 (2006.01)
F15C 1/16 (2006.01)

(52) U.S. Cl. .......................... 422/131; 526/64; 526/65; 526/88; 526/89; 137/3; 137/812

(58) Field of Classification Search ................. 422/131; 526/64, 65, 88, 89; 137/3, 812
See application file for complete search history.

(56) References Cited

U.S. PATENT DOCUMENTS

| | | | |
|---|---|---|---|
| 5,035,794 A * | 7/1991 | Atwood | 208/262.1 |
| 5,417,930 A | 5/1995 | McDonald, Jr. et al. | |
| 2004/0192992 A1 | 9/2004 | Van Egmond et al. | |
| 2005/0101751 A1 | 5/2005 | Shaffer et al. | |
| 2005/0107536 A1 | 5/2005 | Shaffer et al. | |
| 2005/0187366 A1 | 8/2005 | Lovegrove et al. | |
| 2006/0079655 A1 | 4/2006 | Chung et al. | |
| 2006/0084770 A1 | 4/2006 | Milner et al. | |
| 2006/0094847 A1 | 5/2006 | Milner et al. | |
| 2006/0100398 A1 | 5/2006 | Shaffer et al. | |
| 2006/0111522 A1 | 5/2006 | McDonald et al. | |

FOREIGN PATENT DOCUMENTS

| | | |
|---|---|---|
| GB | 1 564 889 | 4/1980 |
| WO | WO 03/037834 | 5/2003 |

(Continued)

Primary Examiner—Walter D Griffin
Assistant Examiner—Natasha Young

(57) ABSTRACT

A transfer method and system (8) to discharge overflow slurry from a polymerization reactor (10) to a tank (14). The method includes thermally isolating a conduit extension (28) at a distal end of a transfer line (20) from a quench fluid inlet (42) to a quench chamber (12). The transfer system (8) is characterized by an annular thermal barrier around the conduit extension (28) that can include insulation (34) and/or thermally resistant support ring (36), and a trap-free conduit (20) in fluid communication between the reactor (10) and the conduit extension (28). The transfer method and system can reduce or eliminate incidents of transfer line (20) plugging in the manufacture of isoolefin polymers and copolymers.

60 Claims, 7 Drawing Sheets

FOREIGN PATENT DOCUMENTS

| WO | WO 2004/058827 | 7/2004 |
| WO | WO 2004/058828 | 7/2004 |
| WO | WO 2004/058829 | 7/2004 |
| WO | WO 2004/067577 | 8/2004 |
| WO | WO 2006/011868 | 2/2006 |

* cited by examiner

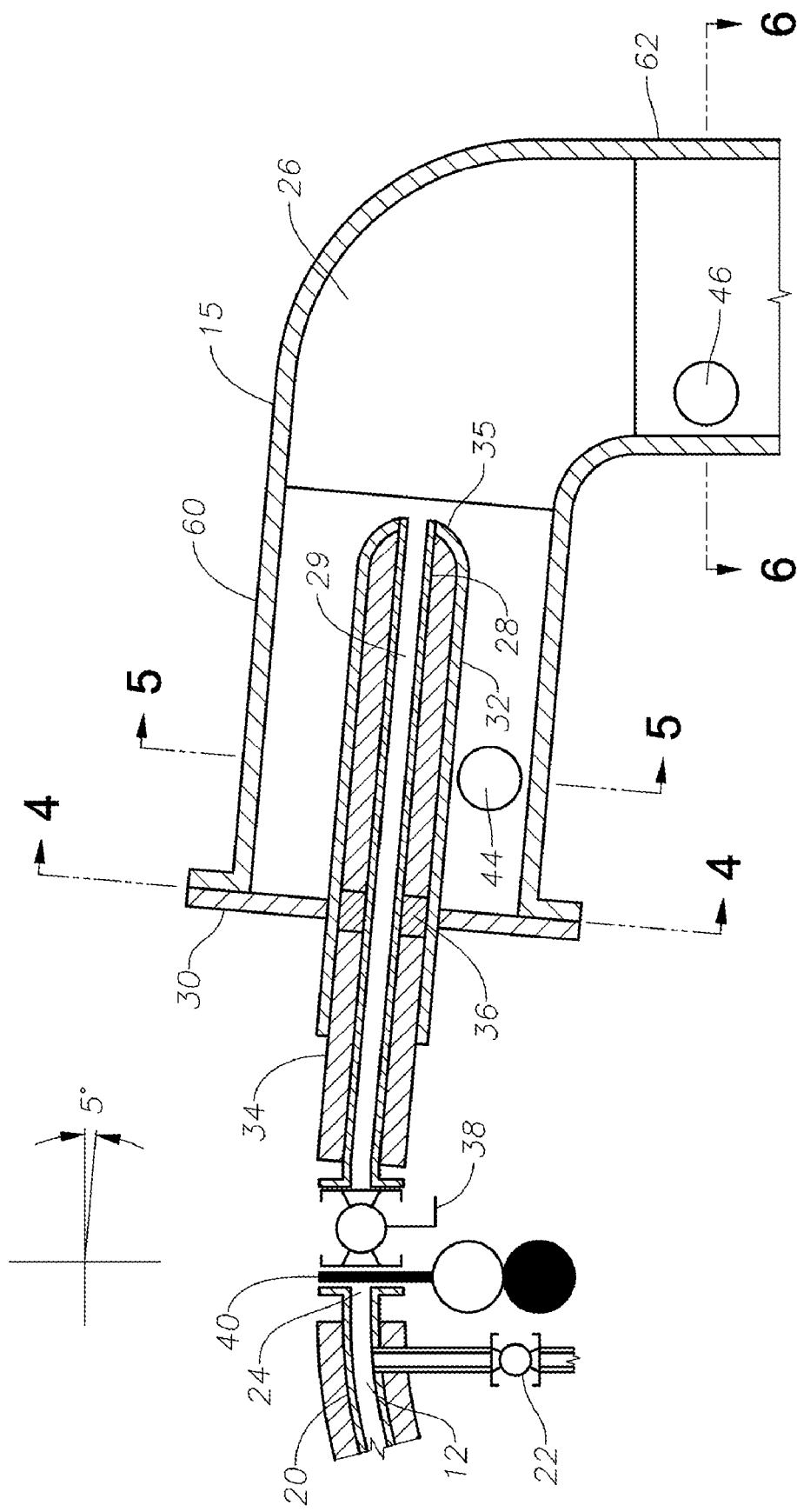

POLYMERIZATION QUENCH METHOD AND SYSTEM

FIELD OF INVENTION

The invention relates to a method and system to quench and transfer a polymer slurry from a polymerization reactor to a flash tank to minimize plugging of the transfer line.

BACKGROUND

Industry has generally accepted widespread use of a slurry polymerization process to produce butyl rubber in a diluent, commonly methyl chloride. Typically, the polymerization of isoolefins such as isobutylene with any comonomers uses methyl chloride at low temperatures, generally lower than −90° C., as a diluent for a reaction mixture. Methyl chloride is used for a variety of reasons, including that it dissolves monomers and aluminum chloride catalyst but not polymer product. Methyl chloride also has suitable freezing and boiling points to permit, respectively, low temperature polymerization and effective separation from the polymer and unreacted monomers.

Commercial reactors typically used to make butyl rubber slurries are well mixed vessels of greater than 10 to 30 liters in volume with a high circulation rate provided by pump impellers. The polymerization and the pumps both generate heat, which is removed by heat exchangers to keep the slurries cold. The slurries are circulated through heat exchanger tubes. The product slurry is generally transferred from the butyl reactor to a quench drum or tank where it is mixed with a quench fluid, usually steam and/or hot water, to terminate any further polymerization and remove the diluent.

The polymer usually has a lower density than the diluent, and a reactor overflow line is used to transfer the polymer slurry from the reactor. The overflow transfer line is typically in the shape of an inverted U which can accommodate the thermal expansion between the chilled polymerization reactor (−90° C. or below) and a flash tank that is generally operated at a relatively warmer temperature ranging from the boiling point of the diluent up to the boiling point of water, e.g. from +40° to 100° C. A schematic illustration of a prior art transfer line 2 connecting a slurry polymerization reactor 4 and a flash tank 6 can be seen in FIG. 1. The transfer line 2 typically terminates at a quench nozzle 7 wherein it is mixed with steam and/or hot water 8 which can be withdrawn and pumped from the lower end of the flash tank 6.

Reactor overflow transfer lines have a tendency to plug during polymer production cycles when using methyl chloride diluent. In methyl chloride diluent, the polymer particles tend to contain dissolved diluent and can be soft with a tendency for particles to stick together and to reactor surfaces, i.e. the particles are "sticky" and thought to cause transfer line plugging by agglomeration of particles and adhesion to the surfaces in the transfer line. Typically with methyl chloride diluent, the transfer line can be unplugged using a steaming practice which is thought to evaporate a thin film of methyl chloride on the internal surfaces of the line and/or to expel methyl chloride from the polymer particles. Elaborate steam sparging lines and condensate collection systems (not shown), including steam jacketing of the transfer line, have been devised for unplugging or preventing plugging of the transfer lines. The plug can often be released in this manner and pressured out of the transfer line, due to the soft nature of the rubber particles when using methyl chloride.

More recently, the polymerization of isobutylene and other monomers in hydrofluorocarbon (HFC) diluents, such as tetrafluoroethane, has been disclosed. The utilization of HFC's in diluents or blends of diluents has created new polymerization systems that reduce particle agglomeration, and also can eliminate or reduce the amount of chlorinated hydrocarbons such as methyl chloride in polymerization systems. Such new polymerization systems reduce particle agglomeration and fouling in the reactor without having to compromise process parameters, conditions, or components and/or without sacrificing productivity/throughput and/or the ability to produce high molecular weight polymers. HFC's are chemicals that are currently used as environmentally friendly refrigerants because they have a very low (even zero) ozone depletion potential, and also typically have low flammability particularly as compared to hydrocarbons and chlorinated hydrocarbons.

Some polymerization media, processes, reactors and systems that can employ HFC's are disclosed in the following commonly assigned patent references: WO2004058827; WO2004058828; WO2004058829; WO2004067577; WO2006011868; US2005101751; US2005107536; US2006079655; US2006084770; US2006094847; US2006100398; and US2006111522.

When using an HFC, the transfer line also has a tendency to plug and, unlike methyl chloride slurries, can not be easily cleared with the application of steam and pressure. This is surprising because the HFC slurry particles are not as sticky as the methyl chloride slurry particles, and the stickiness of polymer particles is widely believed to be a major contributing factor to transfer line plugging. On the other hand, the HFC slurry particles are hard and have a tendency to form very hard plugs which cannot be removed by steaming.

It is estimated that, regardless of the diluent used, transfer line plugging has been a significant source of down time for butyl reactors used in the industry for more than half a century. Yet, very little research and development has been forthcoming on the subject of inhibiting or eliminating transfer line plugging events. One approach, that demonstrates both the difficulty of the problem and the overly complicated attempts which operators are willing to undertake in order to try to solve the problem, involves the use of a twin screw extruder in the transfer line as disclosed in U.S. Patent Pub. No. US2005187366.

There is clearly a long-felt and unsatisfied need in the art for improved transfer line systems and methods for use with butyl reactors and similar processes, that are simple in design and operation, and effectively avoid the frequent occurrence of plugging.

SUMMARY OF THE INVENTION

According to the present invention, the slurry from the reactor is transferred into a quench chamber via an adiabatic flow passage. The slurry is thermally isolated from any quench fluid, and can also be isolated from heat conduction from the wall of the quench chamber at the location of entry of the transfer line. For example, the transfer line can be insulated. A further improvement can include the elimination of the downward leg from the U-shaped transfer line, which eliminates the trap from the transfer line design of the prior art. The use of an adiabatic and/or trapless transfer line can effectively avoid a frequent incidence of transfer line plugging. This result is surprising given the prevalence of the practice of applying external steam to avoid or remove transfer line plugs in the prior art.

In one aspect, the invention provides a method to transfer a slurry from a polymerization reactor. The method can include discharging the slurry from the reactor to a transfer line terminating into a quench chamber, and passing the slurry horizontally, inclined upwardly, vertically or a combination thereof through a conduit in the transfer line and through a conduit extension through an opening in a wall of the quench chamber to an outlet from the transfer line. The method can include an initial introduction of a quench fluid into the quench chamber adjacent to the conduit extension. A step of the method can include thermally isolating the conduit extension from the wall and the quench fluid.

In an embodiment, the method can include draining a mixture of the slurry and quench fluid from the quench chamber into a tank, e.g. a flash tank. The outlet from the transfer line can be at a distal end of the conduit extension, axially spaced away from the wall.

In an embodiment, the flow passage through the conduit is trapless. A velocity of the slurry in the conduit can be maintained to exceed a terminal flotation velocity of polymer particles in the slurry, and in another embodiment, such that the particles do not settle or adhere to the wall of the flow passage. In one embodiment, the slurry velocity is maintained at or above 0.91 m/s (3 ft/s).

In one embodiment, the first quench fluid introduction can include establishing a tangential swirl flow pattern of the quench fluid at a cylindrical surface of the quench chamber between the wall and the outlet of the conduit extension.

In embodiments, the method can include housing the conduit extension in a coaxial outer tube, and disposing insulation in an annulus between the conduit extension and the outer tube. Further, the conduit can be stabilized in the outer tube, e.g. with a support disposed in the annulus. The support can be a ring and/or made of a thermally resistant material. A distal end of the outer tube can be sealed to an outer surface of the conduit extension.

In an embodiment, the method can include inclining the conduit extension downwardly into the quench chamber at an angle from zero to five degrees from horizontal, e.g. to drain into the quench chamber. In other embodiments, the method can include polishing a surface of the flow passage, especially electropolishing, and/or forming smooth bore transitions between adjacent sections of the transfer line. Further, the method can include maintaining a slurry flow orientation through the conduit vertical, inclined upwardly, horizontal or a combination thereof along a length of the conduit between the reactor and the conduit extension. Preferably, any turns in the conduit can be formed at a large radius, i.e. a radius of 0.91 m (about 3 ft) or more.

In an embodiment of the method, a step can include isolating the conduit for maintenance by closing a first isolation valve between the conduit and the reactor and a second isolation valve between the conduit and the quench chamber. In one embodiment, the second isolation valve can be disposed between the conduit and the conduit extension. If desired, the method can include installing a service flange receptacle in the conduit between the first and second isolation valves.

In another embodiment, the method can include discharging the slurry into a lateral section of the quench chamber terminating at the wall, and passing the slurry and quench fluid from the lateral section through an upright riser section in communication with a tank. In a preferred embodiment, the lateral section is sloped downwardly within 5 degrees of horizontal to drain into the riser section. The slurry discharge in the lateral section can have a trajectory into the riser section to inhibit slurry impingement on surfaces of the lateral section. In one embodiment, there is a second quench fluid introduction into the quench chamber that can include establishing a tangential swirl flow pattern of the quench fluid at a cylindrical surface adjacent an upper end of the riser section.

In another aspect of the invention, there is provided a transfer system having utility and transfer slurry from a polymerization reactor, for example, to quench and transfer the slurry to a flash tank according to the method described above. The transfer system can include a first quench fluid inlet to introduce quench fluid into a quench chamber at an outlet of a flow passage from the reactor through a transfer line. The quench chamber can be in communication with a tank and have a relatively larger inside transverse dimension than an outside transverse dimension of the transfer line. In an embodiment, the system can be further characterized by the flow passage comprising a trapless conduit and a conduit extension through an opening in a wall of the quench chamber to the outlet, and a thermal barrier between the wall and the conduit extension and extending along the conduit extension from the opening to the outlet. In an embodiment, an initial quench fluid inlet can include a tangential swirl nozzle axially disposed between the opening in the wall and the outlet of the transfer line.

In an embodiment, an outer tube can house the conduit extension, and insulation can be disposed in an annulus between the conduit extension and the outer tube. The conduit and the outer tube can be coaxial. A support in the annulus between the conduit and the outer tube can space the conduit from the outer tube. For example, the support can be a ring and/or made of a thermally resistant material. A distal end of the outer tube can be sealed to an outer surface of the conduit extension, in one embodiment, e.g. adjacent the outlet, which can be spaced away from the wall. In other embodiments, the wall of the opening to the quench chamber can include a blind flange, and the outer tube can extend through the opening in the blind flange.

In various embodiments, a surface of the flow passage can be polished, optionally including electropolishing, and the system can include smooth bore transitions between adjacent sections of the flow passage. In one embodiment, the conduit can be vertical, sloped upwardly, horizontal or a combination thereof along its length. The conduit extension can be horizontal or inclined downwardly into the quench chamber at an angle up to five degrees from horizontal. The system can also include a first isolation valve between the conduit and the reactor and a second isolation valve between the conduit and the quench chamber. The second isolation valve can be disposed between the conduit and the conduit extension. A service flange receptacle can also be disposed in the conduit between the first and second isolation valves, e.g. at an end of the conduit adjacent the second valve.

In an embodiment, the quench chamber can also include a lateral section terminating at the wall and an upright riser section for fluid communication between the lateral section and the tank. The lateral section can be within 5 degrees of horizontal and the riser section within 5 degrees of vertical. Alternatively, the riser section can be inclined between 5 degrees and 50 degrees of vertical. A second quench fluid inlet can include a tangential swirl nozzle disposed adjacent an upper end of the riser section.

In another aspect the invention provides a polymerization system. The system can include a slurry polymerization reactor with one or more feed lines to supply monomer, catalyst and diluent to the reactor, a quench chamber to mix slurry from the reactor with quench fluid, a tank in communication with the quench chamber, and a slurry transfer line in fluid communication between the reactor and the quench chamber, wherein the quench chamber has a relatively larger inside transverse dimension than an outside transverse dimension of the transfer line. The system can also include a first quench fluid inlet to introduce quench fluid into the quench chamber at an outlet of a flow passage through the transfer line, wherein the flow passage comprises a trapless conduit and a conduit extension through an opening in a wall of the quench chamber to the outlet, and a thermal barrier between the wall and the conduit extension and extending along the conduit extension from the opening to adjacent the outlet. In an embodiment, the tank comprises a flash tank.

In an embodiment, the polymerization system can further include a coaxial outer tube housing the conduit extension, insulation disposed in an annulus between the conduit extension and the outer tube, a thermally resistant support, which can be a ring, disposed in the annulus between the conduit and the outer tube to space the conduit from the outer tube, and a seal between a distal end of the outer tube and an outer surface of the conduit extension adjacent the outlet, which can be axially spaced away from the wall. In an embodiment, the wall of the opening to the quench chamber comprises a blind flange, and the outer tube can extend through the opening in the blind flange. In an embodiment, the conduit extension can be horizontal or inclined downwardly into the quench chamber at an angle up to five degrees from horizontal.

In another embodiment of the polymerization system, a surface of the flow passage can be polished, e.g. electropolished. The polymerization system can further include smooth bore transitions between adjacent sections of the flow passage. The conduit can be vertical, sloped upwardly, horizontal or a combination thereof along its length. The system can also include a first isolation valve between the conduit and the reactor, a second isolation valve between the conduit and the conduit extension, and a service flange receptacle between the conduit and the second isolation valve.

In an embodiment of the polymerization system, the quench chamber can include a lateral section within 5 degrees of horizontal terminating at the wall, and an upright riser section for fluid communication between the lateral section and the tank vertical or inclined within 50 degrees of vertical. The system can also include a second quench fluid inlet comprising a tangential swirl nozzle disposed adjacent an upper end of the riser section.

DRAWINGS

FIG. 3 is a detailed cross-sectional illustration of the area of the transfer system enclosed by line 3 in FIG. 2.

DETAILED DESCRIPTION

Figure 2:
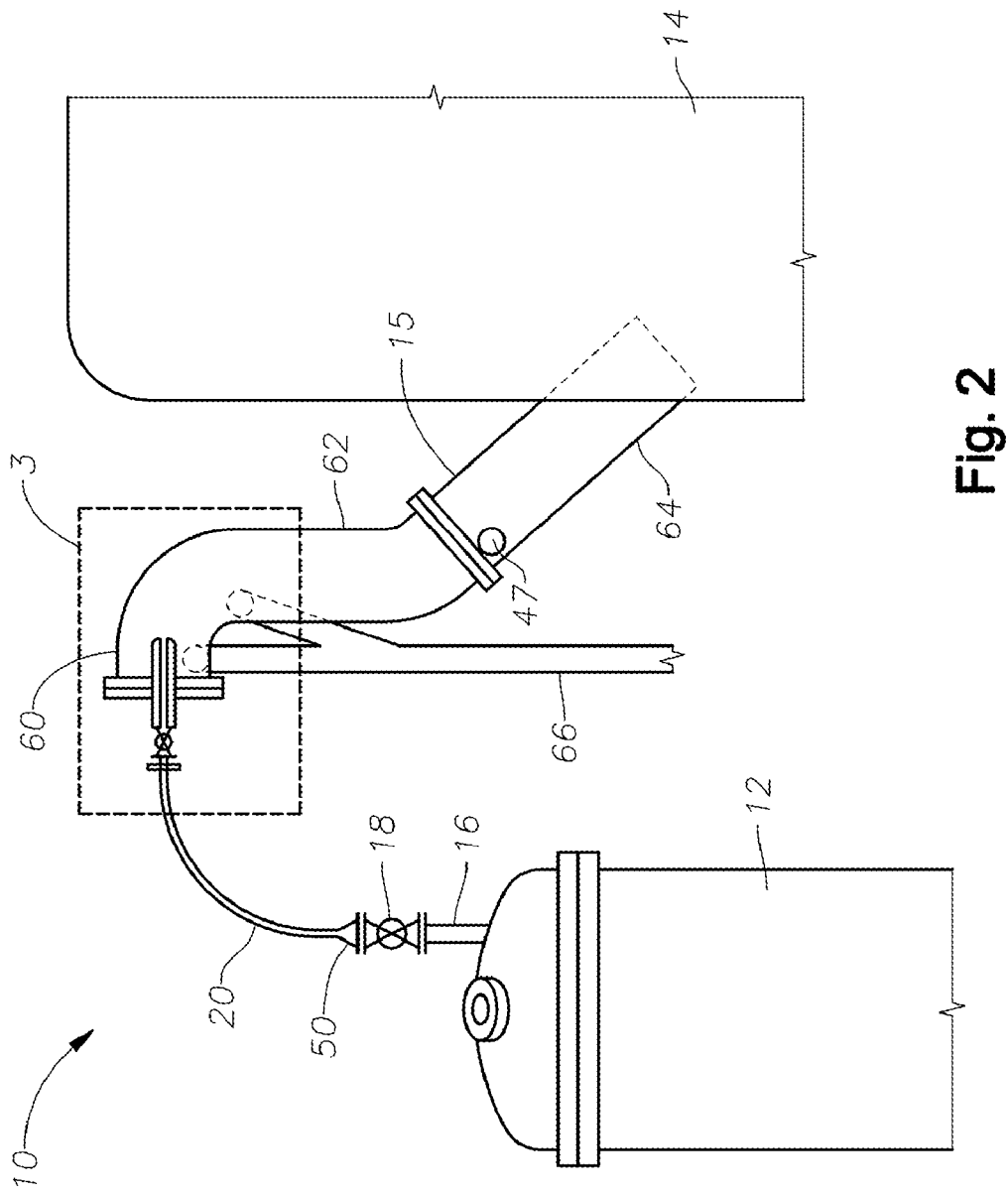
FIG. 2 is a schematic illustration of a transfer system between a slurry polymerization reactor and a quench chamber of a flash tank, according to one embodiment of the invention.
Figure 1:
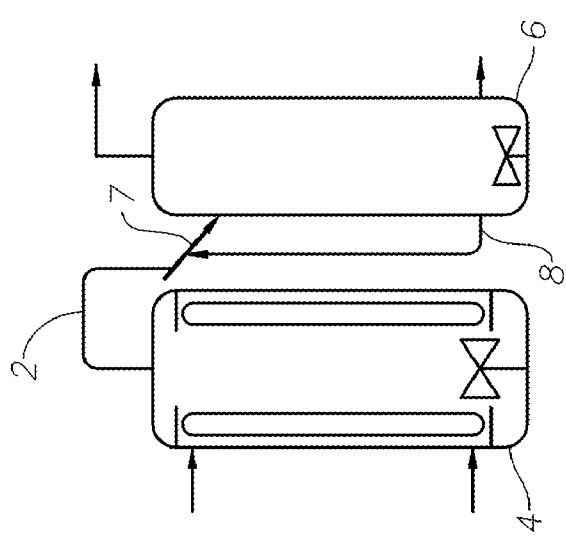
FIG. 1 is a schematic illustration of a prior art U-tube overflow line from a reactor to a flash tank.

The invention relates to a system and method to quench and transport a slurry of polymer and diluent to a flash tank from a reactor which is producing isoolefin polymers or copolymers such as butyl rubber, polyisobutylene, etc.

For purposes of this invention and the claims thereto, the term "reactor" is any container(s) in which a chemical reaction occurs. Commercial reactors typically used to make these polymers can be well mixed vessels of greater than 10 to 30 liters in volume with a high circulation rate provided by a pump impeller. The polymerization and the pump can both generate heat and, in order to keep the slurry cold, the reaction system can include heat exchangers. An example of such a continuous flow stirred tank reactor ("CFSTR") is found in U.S. Pat. No. 5,417,930, incorporated by reference. In these reactors, slurry can circulate through tubes of a heat exchanger. Cooling can be provided, for example, by boiling ethylene on the shell side. The slurry temperature can be set by the boiling ethylene temperature, the required heat flux and the overall resistance to heat transfer.

"Slurry" refers to a volume of diluent including polymer that has precipitated from, for example, the diluent, monomers, catalyst system components, e.g. Lewis acid, initiator, modifiers and so on.

"Diluent" means a diluting or dissolving agent. Diluent can include chemicals that can act as solvents for the catalyst system components, monomers or other additives. Pure diluent does not generally alter the general nature of the components of a polymerization medium, i.e., the components of the catalyst system, monomers, etc.; however, some limited interactions between the diluent and reactants can occur. Additionally, the term diluent can include mixtures of two or more diluents. Further, halogenated hydrocarbons, such as, for example, methyl chloride and hydrofluorocarbons, are merely non-limiting examples of diluents which can be suitable for use in this invention.

"Quench" or "quenching" refers to the process of rapidly heating and mixing the slurry from the reactor with a quench medium, usually water and/or steam, wherein further polymerization is terminated. For example, the slurry can leave the reactor colder than −90° C. and enter the flash tank at 60° C.

"Trap" refers to a bend or partitioned chamber in a line in which a material of relatively lower density can accumulate and inhibit, block or seal the line to the passage of a relatively higher density, such as, for example, the top of a return bend. "Trapless" as used in the specification and claims refers to a line or section of line that is free of traps, and preferably is generally free of significant downward hydraulic flow passages, e.g. a line or passage consisting essentially of horizontal, vertical, and upwardly inclined sections or a combination thereof over a given length or section of the line, more preferably a non-negatively sloped line. A downward hydraulic flow passage in a line is significant for the purposes of this invention when it has a total vertical height more than twice the radius of the line where the line has a uniform circular cross section, or more than twice the hydraulic radius in the case of a cross section other than circular.

The orientation of a slope or inclination, i.e. up/positive or down/negative, is taken in the normal direction of flow under steady state process operating conditions.

One non-limiting example of a transfer system according to the present invention includes a transfer line from a slurry polymerization reactor into a quench chamber associated with a flash tank. FIG. 2 is a schematic illustration of a transfer system 10 between a slurry polymerization reactor 12 and a flash tank 14, wherein the quench chamber is conveniently provided in the form of an enlarged pipe or nozzle 15, according to one embodiment of the invention. Reactor outlet 16 can be an overflow outlet, as is known in the art, and upstream isolation valve 18 can connect reactor outlet 16 to conduit 20. The nozzle 15 can include a lateral section 60, an upright or riser section 62, and a base section 64 permanently attached to the tank 14. The base section 62 is sometimes referred to as a stubby pipe or stub. Reactor 12 can discharge slurry from an outlet 16 thereof. In the illustrated embodiment, conduit 20 can connect to quench nozzle 15 as discussed in more detail below.

In an embodiment, conduit 20 can be trapless between the reactor 12 and the quench nozzle 15, and in another embodiment, without a negative slope. Negative slope in the conduit can tend to form a trap, which is generally undesirable because it can promote plugging. The conduit 20 is preferably insulated FIG. 3 is a close-up cross-sectional illustration of the transfer system 10 of FIG. 2 showing the area where the conduit 20 connects to the quench nozzle 15. The hydraulic flow passage from conduit 20 can ultimately terminate at an outlet 24 in communication with the chamber 26 defined by the quench nozzle 15. The conduit 20 can be connected to a conduit extension 28, which can be separate or integral with conduit 20. A downstream isolation valve 38 and a service flange receptacle 40 can conveniently be disposed in the transfer line between the conduit extension 28 and conduit 20. The receptacle 40 can receive a conventional service flange, also referred to in the art as a figure-eight blind or a spectacle blind, which comprises a spacer element for normal operation connected to a blind flange optionally with maintenance fluid entry taps, that can be alternately positioned in the receptacle 40 between operating and maintenance modes as needed. A wash fluid inlet to the conduit 20, including wash valve 22 can, if desired, alternatively or additionally be provided for maintenance, usually when the reactor 12 is not operating, to supply solvent or other fluid, for example naphtha, that can be used as a solvent to clear the conduit 20, reactor 12 or other equipment.

Figure 4:
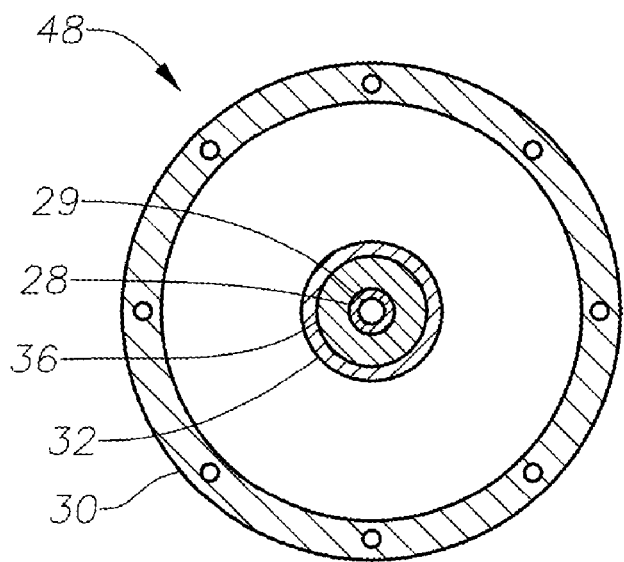
FIG. 4 is a cross-sectional illustration at the blind flange 30 of FIG. 3 as seen along the lines 4-4.

Conduit extension 28 can extend through an end or side wall of quench nozzle 15, for example, conduit extension 28 can conveniently protrude through a blind flange 30 at the end of the quench nozzle 15. FIG. 4 is a cross-sectional illustration at the blind flange 30 of FIG. 3 as seen along the lines 4-4. Conduit extension 28 can be housed in an outer tube 32, and a layer of insulation 34 (see FIG. 3) can be disposed in an annulus between the conduit extension 28 and the outer tube 32, forming an annular thermal barrier. The annulus can be provided with a distal seal 35, which can conveniently be formed by welding a centrally perforated pipe cap at the distal ends of the outer tube 32 and the conduit extension 28. A support ring 36 can be disposed in the annulus between the conduit 28 and the outer tube 32 to space the conduit from the outer tube. The support ring can stabilize the conduit extension 28 to minimize stresses on the welded connections at the distal seal 35. The support ring 36 can preferably be made of a durable material with a relatively high resistance to thermal conduction, such as, for example, polytetrafluoroethylene (PTFE). The conduit extension 28 and/or lateral section 60 of the nozzle 15 can be horizontal or, if desired, inclined slightly downwardly, for example, at an angle up to five degrees from horizontal, to facilitate liquid drainage into the riser section 62.

Figure 5:
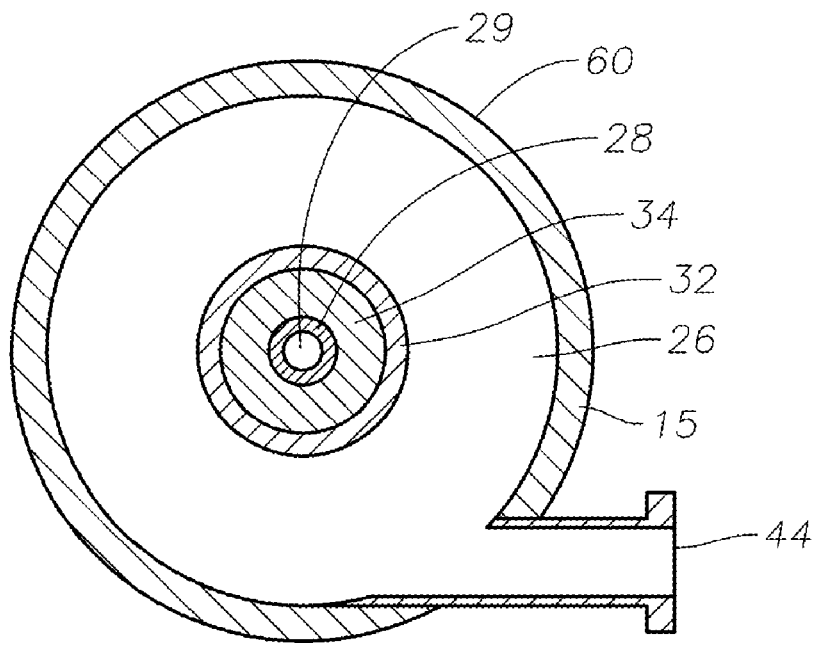
FIG. 5 is a cross-sectional illustration at the first quench fluid inlet 44 of FIG. 3 as seen along the lines 5-5.

Flow passage 29 can terminate at a distal end of the conduit extension 28 in the lateral section 60 and/or adjacent an upper end of the riser 62. In one embodiment, the termination, inside diameter and attitude of the conduit extension 62 are designed so that a trajectory of the exiting slurry at design flow rates and velocities falls into the riser 62 with minimal or no impingement on the internal surfaces of the lateral section 60. FIG. 5 is a cross-sectional illustration of a swirl nozzle 44, which can be a first water inlet adjacent the conduit extension 28. The wall of the nozzle 15, chamber 26, outer tube 32, insulation 34, conduit extension 28, and flow passage 29 can form concentric circles as shown. Swirl nozzle 44 can introduce the quench liquid tangentially with respect to the local diameter of the nozzle 15, and thus impart a helical flow pattern at the inner surface of the nozzle 15 in lateral section 60. However, if the nozzle 15 has a sharp bend or turn from a lateral into a riser section 62, the liquid flow may change to an axial flow pattern, and an auxiliary or supplemental quench liquid can be introduced.

Figure 6:
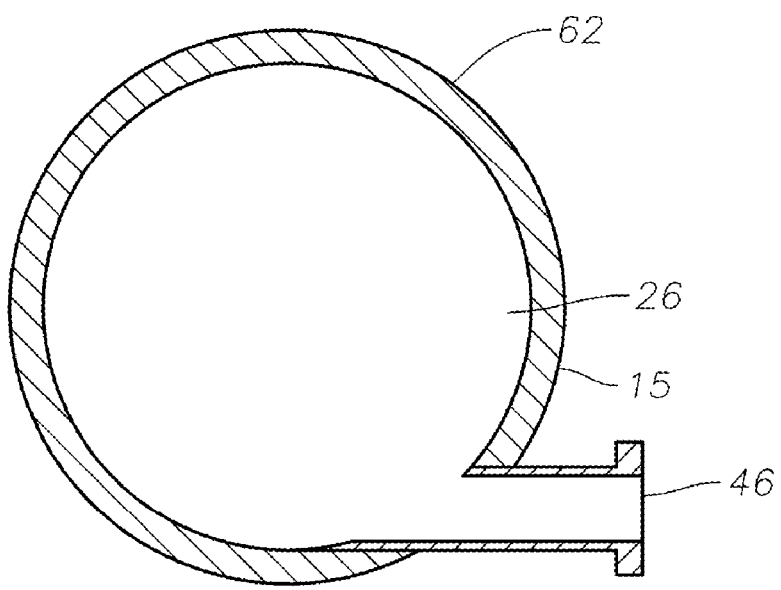
FIG. 6 is a cross-sectional illustration at the second quench fluid inlet 46 of FIG. 3 as seen along the lines 6-6.

FIG. 6 is a cross-sectional illustration of a second water inlet which can be at an upper end of the riser 62. The auxiliary quench fluid inlet can include a tangential swirl nozzle 46 to impart a helical quench liquid flow pattern along a surface of the riser 62. The swirl nozzle can inhibit the particles from floating up and agglomerating. An additional tangential swirl nozzle 47 (see FIG. 2) can be disposed in the base section 64 or at another location(s) in the nozzle 15. The swirl nozzles 44, 46, 47 can be used to rapidly heat the slurry, sweep away any impinging polymer particles, and inhibit any buildup of polymer particles in the quench nozzle 15. Steam and/or condensate can be used as an alternative quench liquid or in addition to water recirculated from flash tank 14 via line 66 (see FIG. 2).

The transfer system 10 can be installed using materials appropriately selected for the intended service and operating conditions either in new construction or as a retrofit of an existing butyl reactor facility. For conversion of an existing transfer line, the conduit 20, the assembly at the blind flange 30, the lateral section 60, and the riser section 62, as well as any connecting lines or fittings, can be pre-fabricated, along with any new support or access structure that may be required. For example, a raised deck (not shown) may be desired to allow personnel access at the elevation of the assembly of the blind flange 30, and also to provide sufficient height to permit personnel access below the raised deck. By beginning disconnection and removal of the old transfer system components when the prefabricated replacement components are already on hand, down time for the installation of the new components of the transfer system 10 can thus be minimized.

In operation, the cold slurry can be passed through the conduit 20 and conduit extension 28 into the quench chamber 26 in the nozzle 15. Hot water can supplied to the quench chamber 26 via the swirl nozzles 44, 46 and 47 to rapidly heat the slurry entering the chamber 26. The quench water can contain a slurry aid, such as zinc stearate or calcium stearate, to coat and lubricate polymer in the quench nozzle to release polymer agglomerates on surfaces and inhibit large agglomerates from forming. The slurry aid can be added directly to the quench water supply, or alternatively or additionally, the slurry aid can be added to the flash tank and then pumped to the quench nozzle with water withdrawn from the bottom of the flash tank. The quench fluid can wash away any polymer impinging on the walls of the quench chamber 26 and effectively inhibit adhesion of solids. The slurry and water can drain through the riser section 62 and base section 64 into the flash tank 14 for processing in the usual manner.

Cold, adiabatic operation of the conduit 20 and conduit extension 28 minimize agglomeration of polymer particles on internal surfaces in the transfer line. The insulation of the conduit extension 28 can facilitate isothermal or nearly isothermal operation adjacent the blind flange 30, and can avoid the formation of hot spots that might tend to result in restriction or plugging. Additionally, the conduit 20 and/or conduit extension 28 can be chilled in one embodiment, for example, by running a refrigerant tracing line (not shown) under the insulation. In one embodiment, steam sparging or other heating of the conduit 20 and/or conduit extension 28 is avoided.

In another embodiment, when water vapor is present in the line exiting the reactor 10, i.e. conduit 20 and conduit extension 28, it is possible that the water (with or without a methyl chloride hydrate) will form ice, which can cause blockage. In such event the end of the line can be maintained at a sufficient temperature to prevent ice and/or hydrate formation.

As mentioned previously, in one embodiment the slurry velocity is maintained at a velocity such that it can inhibit particles from settling or adhering to the walls of the flow passage, for example, above the terminal flotation velocity of the rubber particles in the slurry diluent. The terminal flotation velocity can be readily determined by the skilled artisan as a function of the density differences between the particle and the diluent, the size of the particle, and any inclination of the flow passage. In most instances for isobutylene polymers and copolymers produced from a slurry reactor in diluents having a typical density difference between the polymer commercial diluents such as methyl chloride or HFC, the terminal velocity is usually less than 0.91 m/s (3 ft/s), which can thus be used as a design criterion. In retrofit installations where the existing U-tube overflow line is too large to provide the desired slurry velocity, the corresponding replacement conduit 20 may need a smaller diameter. For example, a nominal 76.2 mm (about 3-in.) U-tube may need to be replaced with a nominal 50.8 mm (about 2-in.) conduit 20 to achieve the desired slurry velocity in the transfer line.

Additional features that further facilitate the inhibition of agglomeration of hard or sticky polymer particles in the conduit 20 and conduit extension 28 can include: avoiding sharp bends, providing gradual transitions for flow directional changes or cross sectional flow area changes, providing smooth bore flow passages, minimizing exposed edges in the flow path of the slurry, polishing the surfaces of the flow passage 29, and so on. Bends in the conduit 20 preferably have a radius of at least 30 cm (about 1 ft), more preferably at least 60 cm (about 2 ft), and especially at least 90 cm (about 3 ft).

Figure 7:
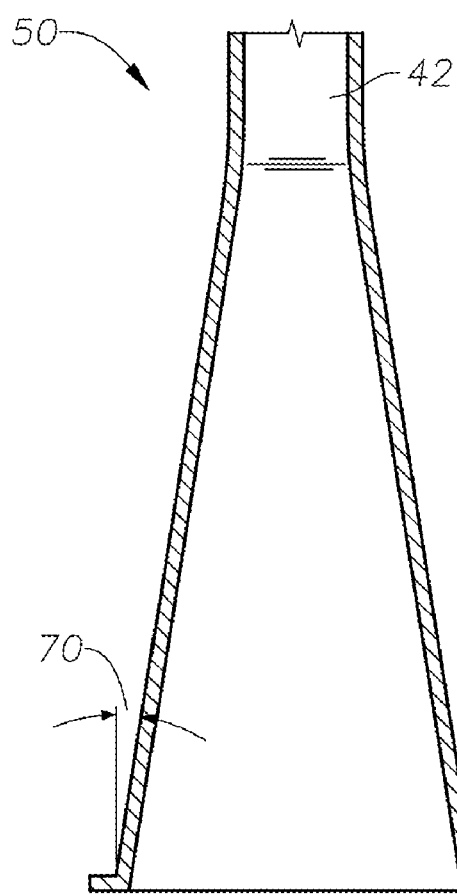
FIG. 7 is a detailed cross-sectional illustration of the reducer 50 seen in the area of the transfer system enclosed by line 7 in FIG. 2.

FIG. 7 illustrates a gradually transitioned reducer 50 that can be employed in the proximal end of the conduit 20 adjacent the upstream isolation valve 18 (see FIG. 2). For example, where the isolation valve is a nominal 76.2 mm (about 3-in.) and the conduit is nominal 50.8 mm (about 2-in.), the reducer 50 will comprise a 76.2 mm by 50.8 mm reducer. A nominal or standard reducer might result in a steep transition that could result in transfer line plugging or restriction. In an embodiment of the invention, the reducer 50 is provided with a gradual conical transition angle 70, preferably not more than 15 degrees from longitudinal, more preferably not more than 12 degrees, more preferably not more than 8 degrees, and especially not more than 5 degrees.

Figure 8:
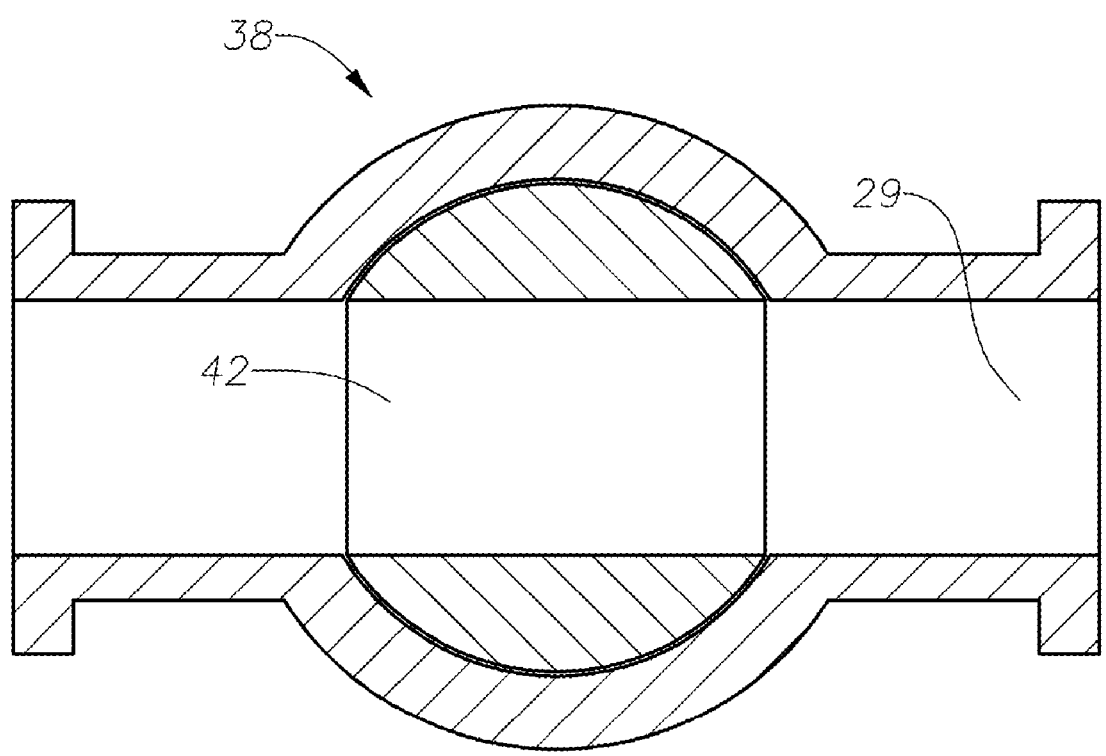
FIG. 8 is a cross-sectional illustration of a full-bore valve, according to one embodiment of the invention.

FIG. 8 is a cross-sectional illustration of one embodiment of the downstream isolation valve 38 (see FIG. 3), which can be the same as the upstream isolation valve 18. The valve 38 can have a ball comprising a full bore 42, i.e. the bore 42 is the same as the bore of the flow passage 29 in the conduit 20 and/or conduit extension 28. This presents a smooth bore transition at the walls of the transfer line between different sections. By minimizing edges and transition discontinuities, turbulence and polymer attachment can be minimized in the vicinity of the transition.

In one embodiment, polishing and in particular electropolishing of the flow passage 29 can be effective to inhibit polymer attachment or deposition at the electropolished surfaces. Electropolishing, sometimes called reverse electroplating, is a well known electrochemical process which polishes a metal surface by removing a microscopic amount of material from the work piece. In electropolishing, the metal work piece is immersed in a temperature controlled bath of electrolyte and connected to the positive terminal (anode) of a DC power supply. The negative terminal is attached to a cathode to which the particles removed from the anode (the work piece) are attracted when electric current is applied. Often, the size, position and distance of the cathode to the work piece are controlled during the process to achieve the desired level of polish and to localize areas of polish. The process also passivates the surface of some steels by enriching chromium on the surface of the steel. This surface then reacts with oxygen, for example, to create the chromium-oxide layer which is the passive layer that prevents stainless steel from rusting.

Figure 9:
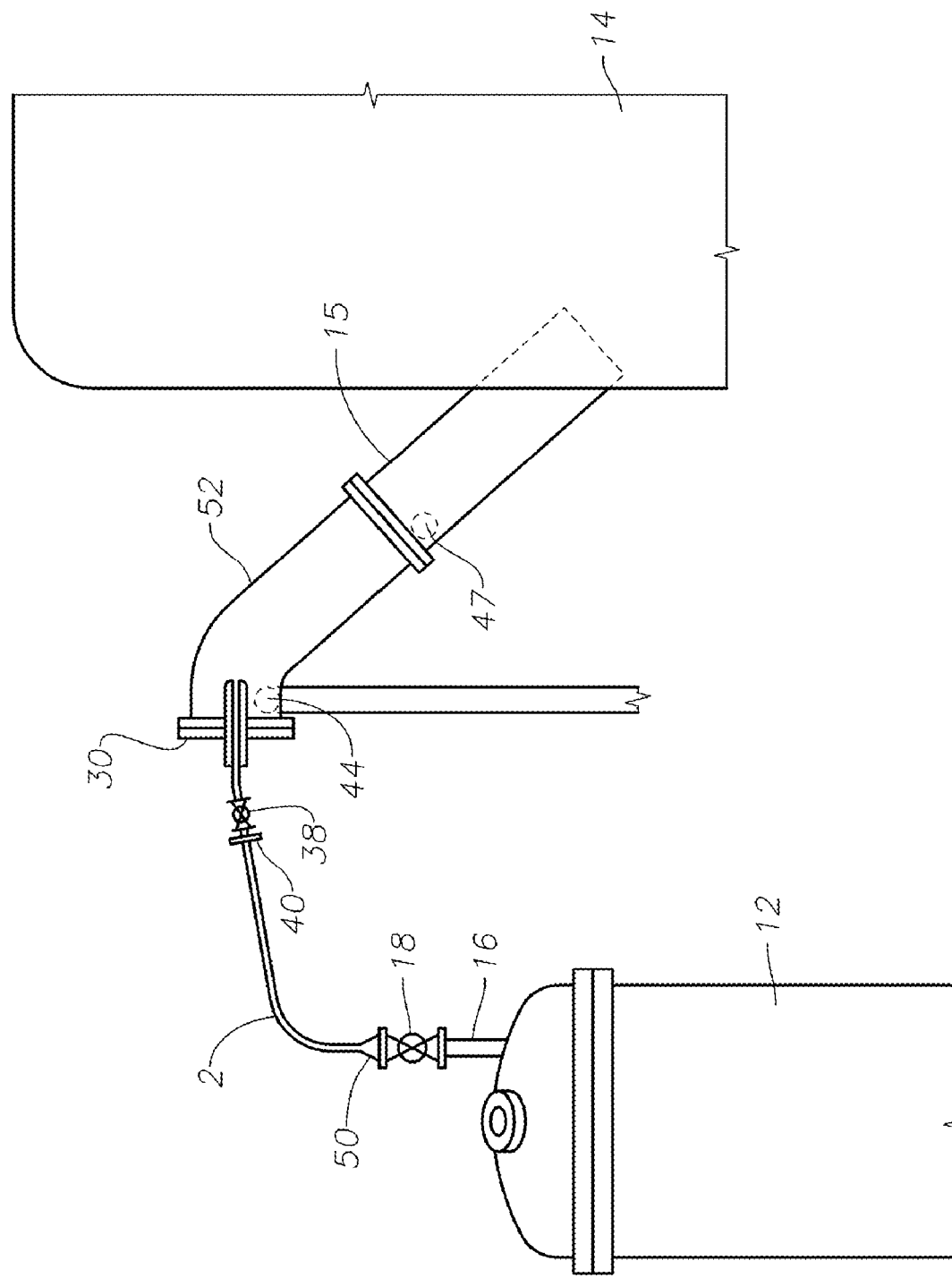
FIG. 9 is a schematic illustration of a transfer system between a slurry polymerization reactor and a quench chamber having an inclined riser section 52, according to another embodiment of the invention.

FIG. 9 is a schematic illustration of a transfer system between a slurry polymerization reactor and a quench nozzle of a flash tank, according to an embodiment of the invention wherein the nozzle 15 has a riser section 52 sloped at 40-50 degrees from vertical. The more gradual bend in the nozzle 15 between the lateral and the riser 52 can provide a tangential flow pattern of the quench liquid from the swirl nozzle 44 along the length of the nozzle 15, thereby eliminating the need for a supplemental swirl nozzle.

Figure 10:
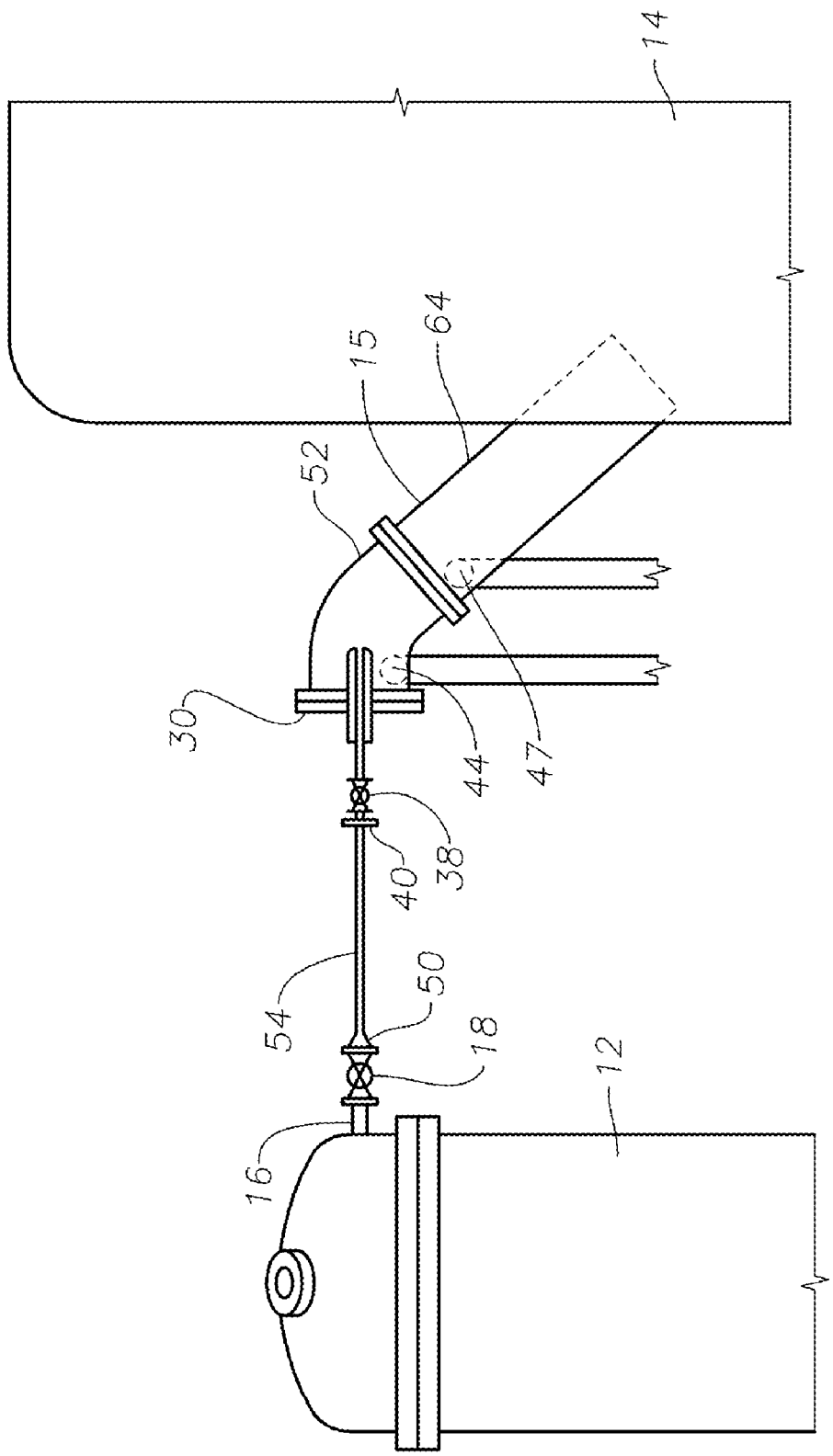
FIG. 10 is a schematic illustration of a transfer system between a slurry polymerization reactor and a quench chamber of a flash tank showing a horizontal transfer line 54, according to another embodiment of the invention.

FIG. 10 is a schematic illustration of a transfer system according to another embodiment of the invention wherein a generally horizontal conduit 54 is employed in the transfer line. In the embodiment illustrated in FIG. 10, the overflow line can be essentially horizontal from the reactor, e.g. incurvate optionally with a slightly negative slope for drainage. The transfer line can be modified to accommodate thermal expansion, for example, the transfer line can include a bellows (not shown) in the conduit 54 and/or the nozzle section 52. The transfer line can further include features and design considerations to aid in the transfer of the slurry to the flash tank. For example, the conduit 54 can include an twin screw extruder element (not shown). An example of a twin-screw extruder and bellows are found in U.S. Patent Pub. No. US2005187366, hereby incorporated herein by reference.

All patents and patent applications, test procedures (such as ASTM methods), and other documents cited herein are fully incorporated by reference to the extent such disclosure is not inconsistent with this invention and for all jurisdictions in which such incorporation is permitted.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

What is claimed is:

1. A method of transferring slurry from a polymerization reactor, comprising:
   discharging the slurry from the reactor to a transfer line terminating into a quench chamber;
   passing the slurry horizontally, inclined upwardly, vertically or a combination thereof through a conduit in the transfer line and through a conduit extension through an opening in a wall of the quench chamber to an outlet from the transfer line;
   a first introduction of quench fluid into the quench chamber adjacent the conduit extension; and
   thermally isolating the conduit extension from the wall and the quench fluid.

2. The method of claim 1 comprising draining a mixture of the slurry and quench fluid from the quench chamber into a tank.

3. The method of claim 2 wherein the tank comprises a flash tank.

4. The method of claim 1 wherein the outlet is at a distal end of the conduit extension axially spaced away from the wall.

5. The method of claim 1 wherein the conduit is trapless.

6. The method of claim 1 comprising maintaining a velocity of the slurry in the conduit exceeding a terminal flotation velocity of polymer particles in the slurry.

7. The method of claim 1 comprising maintaining a velocity of the slurry in the conduit of at least 0.91 m/s (3 ft/s).

8. The method of claim 1 wherein the first quench fluid introduction comprises establishing a tangential swirl flow pattern of the quench fluid at a cylindrical surface of the quench chamber between the wall and the outlet of the transfer line.

9. The method of claim 1 further comprising housing the conduit extension in a coaxial outer tube, and disposing insulation in an annulus between the conduit extension and the outer tube.

10. The method of claim 9 further comprising stabilizing the conduit in the outer tube with a support disposed in the annulus.

11. The method of claim 10 wherein the support comprises a ring.

12. The method of claim 10 wherein the support comprises a thermally resistant material.

13. The method of claim 10 further comprising sealing a distal end of the outer tube to an outer surface of the conduit extension.

14. The method of claim 1 comprising inclining the conduit extension downwardly into the quench chamber at an angle from zero to five degrees from horizontal.

15. The method of claim 1 comprising polishing a slurry flow surface of the transfer line.

16. The method of claim 1 comprising forming smooth bore transitions between adjacent sections of the transfer line.

17. The method of claim 1 comprising maintaining a slurry flow orientation through the conduit vertical, inclined upwardly, horizontal or a combination thereof along a length of the conduit between the reactor and the conduit extension.

18. The method of claim 1 further comprising isolating the conduit for maintenance by closing a first isolation valve between the conduit and the reactor and a second isolation valve between the conduit and the quench chamber.

19. The method of claim 18 wherein the second isolation valve is disposed between the conduit and the conduit extension.

20. The method of claim 18 further comprising installing a service flange receptacle in the conduit between the first and second isolation valves.

21. The method of claim 1 further comprising discharging the slurry into a lateral section of the quench chamber terminating at the wall, and passing the slurry and quench fluid from the lateral section through an upright riser section in communication with a tank.

22. The method of claim 21 comprising sloping the lateral section downwardly within 5 degrees of horizontal to drain into the riser section.

23. The method of claim 21 wherein the slurry discharge in the lateral section comprises a discharged slurry trajectory into the riser section to inhibit slurry impingement on surfaces of the lateral section.

24. The method of claim 21 further comprising a second quench fluid introduction into the quench chamber comprising establishing a tangential swirl flow pattern of the quench fluid at a cylindrical surface adjacent an upper end of the riser section.

25. A transfer system having utility to transfer slurry from a polymerization reactor, comprising:
   a first quench fluid inlet to introduce quench fluid into a quench chamber at an outlet of a flow passage from the reactor through a transfer line, wherein the quench chamber is in communication with a tank and has a relatively larger inside transverse dimension than an outside transverse dimension of the transfer line, and further characterized by:
   wherein the flow passage comprises a trapless conduit and a conduit extension through an opening in a wall of the quench chamber to the outlet; and
   a thermal barrier between the wall and the conduit extension and extending along the conduit extension from the opening to adjacent the outlet.

26. The transfer system of claim 25 wherein the first quench fluid inlet comprises a tangential swirl nozzle axially disposed adjacent the conduit extension between the opening in the wall and the outlet.

27. The transfer system of claim 25 further comprising an outer tube housing the conduit extension, and insulation disposed in an annulus between the conduit extension and the outer tube.

28. The transfer system of claim 27 wherein the conduit extension and the outer tube are coaxial.

29. The transfer system of claim 27 further comprising a support disposed in the annulus between the conduit and the outer tube to space the conduit from the outer tube.

30. The transfer system of claim 29 wherein the support comprises a ring.

31. The transfer system of claim 29 wherein the support comprises a thermally resistant material.

32. The transfer system of claim 27 further comprising a seal between a distal end of the outer tube and an outer surface of the conduit extension.

33. The transfer system of claim 32 wherein the seal is adjacent the outlet.

34. The transfer system of claim 27 wherein the outlet is axially spaced away from the wall.

35. The transfer system of claim 27 wherein the wall of the opening to the quench chamber comprises a blind flange.

36. The transfer system of claim 35 wherein the outer tube extends through the opening in the blind flange.

37. The transfer system of claim 25 wherein the conduit extension is horizontal or inclined downwardly into the quench chamber at an angle up to five degrees from horizontal.

38. The transfer system of claim 25 wherein a surface of the flow passage is polished.

39. The transfer system of claim 25 comprising smooth bore transitions between adjacent sections of the flow passage.

40. The transfer system of claim 25 wherein the conduit is vertical, sloped upwardly, horizontal or a combination thereof along its length.

41. The transfer system of claim 25 further comprising a first isolation valve between the conduit and the reactor and a second isolation valve between the conduit and the quench chamber.

42. The transfer system of claim 41 wherein the second isolation valve is disposed between the conduit and the conduit extension.

43. The transfer system of claim 41 further comprising a service flange receptacle in the conduit between the first and second isolation valves.

44. The transfer system of claim 25 wherein the quench chamber further comprises a lateral section terminating at the wall and an upright riser section for fluid communication between the lateral section and the tank.

45. The transfer system of claim 44 wherein the lateral section is within 5 degrees of horizontal and the riser section is within 5 degrees of vertical.

46. The transfer system of claim 44 wherein the lateral section is within 5 degrees of horizontal and the riser section is inclined between 5 degrees and 50 degrees of vertical.

47. The transfer system of claim 44 further comprising a second quench fluid inlet comprising a tangential swirl nozzle disposed adjacent an upper end of the riser section.

48. The transfer system of claim 25 wherein the quench chamber further comprises a lateral section within 5 degrees of horizontal terminating at the wall, and an upright riser section for fluid communication between the lateral section and the tank vertical or inclined within 50 degrees of vertical.

49. The transfer system of claim 48 further comprising a second quench fluid inlet comprising a tangential swirl nozzle disposed adjacent an upper end of the riser section.

50. A polymerization system, comprising:
   a slurry polymerization reactor with one or more feed lines to supply monomer, catalyst and diluent to the reactor;
   a quench chamber to mix slurry from the reactor with quench fluid;
   a tank in communication with the quench chamber;
   a slurry transfer line in fluid communication between the reactor and the quench chamber, wherein the quench chamber has a relatively larger inside transverse dimension than an outside transverse dimension of the transfer line;
   a first quench fluid inlet to introduce quench fluid into the quench chamber at an outlet of a flow passage through the transfer line;
   wherein the flow passage comprises a trapless conduit and a conduit extension through an opening in a wall of the quench chamber to the outlet; and
   a thermal barrier between the wall and the conduit extension and extending along the conduit extension from the opening to adjacent the outlet.

51. The polymerization system of claim 50 wherein the tank comprises a flash tank.

52. The polymerization system of claim 50 further comprising a coaxial outer tube housing the conduit extension, insulation disposed in an annulus between the conduit extension and the outer tube, a thermally resistant support disposed in the annulus between the conduit and the outer tube to space the conduit from the outer tube, and a seal between a distal end of the outer tube and an outer surface of the conduit extension adjacent the outlet.

53. The polymerization system of claim 52 wherein the outlet is axially spaced away from the wall.

54. The polymerization system of claim 53 wherein the wall of the opening to the quench chamber comprises a blind flange.

55. The polymerization system of claim 54 wherein the outer tube extends through the opening in the blind flange.

56. The polymerization system of claim 50 wherein the conduit extension is horizontal or inclined downwardly into the quench chamber at an angle up to five degrees from horizontal.

57. The polymerization system of claim 50 wherein a surface of the flow passage is polished.

58. The polymerization system of claim 50 comprising smooth bore transitions between adjacent sections of the flow passage.

59. The polymerization system of claim 50 wherein the conduit is vertical, sloped upwardly, horizontal or a combination thereof along its length.

60. The polymerization system of claim 50 further comprising a first isolation valve between the conduit and the reactor, a second isolation valve between the conduit and the conduit extension, and a service flange receptacle between the conduit and the second isolation valve.

* * * * *

UNITED STATES PATENT AND TRADEMARK OFFICE
CERTIFICATE OF CORRECTION

PATENT NO. : 7,771,667 B2  Page 1 of 1
APPLICATION NO. : 12/020191
DATED : August 10, 2010
INVENTOR(S) : Baud et al.

It is certified that error appears in the above-identified patent and that said Letters Patent is hereby corrected as shown below:

Title Page, Item (12) United States Patent delete "Richard et al." and insert -- Baud et al. --.

On the Title Page, Item (75), please correct the Inventor names as follows:

--E. Baud Richard-- to "Richard E. Baud"
--F. McDonald Michael-- to "Michael F. McDonald"
--T. Milner Scott-- to "Scott T. Milner"
--D. Shaffer Timothy-- to "Timothy D. Shaffer"
--H. Schatz Ralph-- to "Ralph H. Schatz"
--N. Webb Robert-- to "Robert N. Webb"
--J. Wright Pamela-- to "Pamela J. Wright"
--Courseaux Jean-Pierre-- to "Jean-Pierre Courseaux"

Signed and Sealed this

Fifth Day of October, 2010

David J. Kappos
*Director of the United States Patent and Trademark Office*